(12) United States Patent
Agarwal et al.

(10) Patent No.: US 7,836,938 B2
(45) Date of Patent: Nov. 23, 2010

(54) INSERT WITH TABS AND DAMPED PRODUCTS AND METHODS OF MAKING THE SAME

(75) Inventors: Parag Agarwal, Maharashtra (IN); Anil K. Sachdev, Rochester Hills, MI (US); Suresh Sundarraj, Karnatake (IN)

(73) Assignee: GM Global Technology Operations, Inc., Detroit, MI (US)

( * ) Notice: Subject to any disclaimer, the term of this patent is extended or adjusted under 35 U.S.C. 154(b) by 621 days.

(21) Appl. No.: 11/860,049

(22) Filed: Sep. 24, 2007

(65) Prior Publication Data

US 2009/0078520 A1 Mar. 26, 2009

(51) Int. Cl.
*B22D 19/00* (2006.01)
(52) U.S. Cl. .................................. 164/100; 164/98
(58) Field of Classification Search ............... 164/98, 164/100
See application file for complete search history.

(56) References Cited

U.S. PATENT DOCUMENTS

| | | |
|---|---|---|
| 1,989,211 A | 1/1935 | Norton |
| 2,603,316 A | 7/1952 | Pierce |
| 3,085,391 A | 4/1963 | Hatfield et al. |
| 3,147,828 A | 9/1964 | Hunsaker |
| 3,292,746 A | 12/1966 | Robinette |
| 3,378,115 A | 4/1968 | Stephens, III |
| 3,425,523 A | 2/1969 | Robinette |
| 3,509,973 A | 5/1970 | Kimata |
| 3,575,270 A | 4/1971 | Wagenfuhrer et al. |
| 3,774,472 A | 11/1973 | Mitchell |
| 3,841,448 A | 10/1974 | Norton, Jr. |
| 3,975,894 A | 8/1976 | Suzuki |
| 4,049,085 A | 9/1977 | Blunier |
| 4,072,219 A | 2/1978 | Hahm et al. |
| 4,250,950 A | 2/1981 | Buxmann et al. |
| 4,379,501 A | 4/1983 | Hagiwara et al. |
| 4,475,634 A | 10/1984 | Flaim et al. |
| 4,523,666 A | 6/1985 | Murray |
| 4,905,299 A | 2/1990 | Ferraiuolo et al. |
| 5,004,078 A | 4/1991 | Oono et al. |
| 5,025,547 A | 6/1991 | Sheu et al. |
| 5,083,643 A | 1/1992 | Hummel et al. |
| 5,115,891 A | 5/1992 | Raitzer et al. |
| 5,139,117 A | 8/1992 | Melinat |
| 5,143,184 A | 9/1992 | Snyder et al. |
| 5,183,632 A | 2/1993 | Kluchi et al. |

(Continued)

FOREIGN PATENT DOCUMENTS

CN 2005/10113784 10/2005

(Continued)

OTHER PUBLICATIONS

International Search Report dated Apr. 2, 2007 for International Application No. PCT US06/29687, Publication No. WO 2007/040768; GM Global Technology Operations, Inc.

(Continued)

*Primary Examiner*—Kuang Lin
(74) *Attorney, Agent, or Firm*—Reising Ethington P.C.

(57) ABSTRACT

One embodiment includes an insert including a body portion; a plurality of tabs extending from the body portion, wherein the tabs are tapered; and wherein the insert is constructed and arranged to provide damping.

9 Claims, 9 Drawing Sheets

U.S. PATENT DOCUMENTS

| | | |
|---|---|---|
| 5,259,486 A | 11/1993 | Deane |
| 5,310,025 A | 5/1994 | Anderson |
| 5,416,962 A | 5/1995 | Passarella |
| 5,417,313 A | 5/1995 | Matsuzaki et al. |
| 5,509,510 A | 4/1996 | Ihm |
| 5,530,213 A | 6/1996 | Hartsock et al. |
| 5,582,231 A | 12/1996 | Siak et al. |
| 5,620,042 A | 4/1997 | Ihm |
| 5,660,251 A | 8/1997 | Nishizawa et al. |
| 5,789,066 A | 8/1998 | DeMare et al. |
| 5,819,882 A | 10/1998 | Reynolds et al. |
| 5,855,257 A | 1/1999 | Wickert et al. |
| 5,862,892 A | 1/1999 | Conley |
| 5,878,843 A | 3/1999 | Saum |
| 5,927,447 A | 7/1999 | Dickerson |
| 6,047,794 A | 4/2000 | Nishizawa |
| 6,073,735 A | 6/2000 | Botsch et al. |
| 6,206,150 B1 | 3/2001 | Hill |
| 6,216,827 B1 | 4/2001 | Ichiba et al. |
| 6,223,866 B1 | 5/2001 | Giacomazza |
| 6,231,456 B1 * | 5/2001 | Rennie et al. ............... 473/316 |
| 6,241,055 B1 | 6/2001 | Daudi |
| 6,241,056 B1 | 6/2001 | Cullen et al. |
| 6,283,258 B1 | 9/2001 | Chen et al. |
| 6,302,246 B1 | 10/2001 | Naumann et al. |
| 6,357,557 B1 | 3/2002 | DiPonio |
| 6,405,839 B1 | 6/2002 | Ballinger et al. |
| 6,465,110 B1 | 10/2002 | Boss et al. |
| 6,481,545 B1 | 11/2002 | Yano et al. |
| 6,505,716 B1 | 1/2003 | Daudi et al. |
| 6,507,716 B2 | 1/2003 | Nomura et al. |
| 6,543,518 B1 | 4/2003 | Bend et al. |
| 6,799,664 B1 | 10/2004 | Connolly |
| 6,880,681 B2 | 4/2005 | Koizumi et al. |
| 6,890,218 B2 | 5/2005 | Patwardhan et al. |
| 6,899,158 B2 | 5/2005 | Matuura et al. |
| 6,932,917 B2 | 8/2005 | Golden et al. |
| 7,066,235 B2 | 6/2006 | Huang |
| 2002/0084156 A1 | 7/2002 | Ballinger et al. |
| 2002/0104721 A1 | 8/2002 | Schaus et al. |
| 2003/0037999 A1 | 2/2003 | Tanaka et al. |
| 2003/0127297 A1 | 7/2003 | Smith et al. |
| 2003/0141154 A1 | 7/2003 | Rancourt et al. |
| 2003/0213658 A1 | 11/2003 | Baba |
| 2004/0031581 A1 | 2/2004 | Herreid et al. |
| 2004/0045692 A1 | 3/2004 | Redemske |
| 2004/0074712 A1 | 4/2004 | Quaglia et al. |
| 2004/0084260 A1 | 5/2004 | Hoyte et al. |
| 2004/0242363 A1 | 12/2004 | Kohno et al. |
| 2005/0011628 A1 | 1/2005 | Frait et al. |
| 2005/0150222 A1 | 7/2005 | Kalish et al. |
| 2005/0183909 A1 | 8/2005 | Rau, III et al. |
| 2005/0193976 A1 | 9/2005 | Suzuki et al. |
| 2006/0076200 A1 | 4/2006 | Dessouki et al. |
| 2006/0243547 A1 | 11/2006 | Keller |
| 2007/0142149 A1 | 6/2007 | Kleber |

FOREIGN PATENT DOCUMENTS

| | | |
|---|---|---|
| DE | 24 46 938 | 4/1976 |
| DE | 25 37 038 | 3/1977 |
| DE | 199 48 009 | 3/2001 |
| DE | 101 41 698 | 3/2003 |
| DE | 102005048258.9 | 10/2005 |
| EP | 0 205 713 | 12/1986 |
| GB | 1230 274 | 4/1971 |
| GB | 2328952 | 3/1999 |
| JP | 57154533 | 9/1982 |
| WO | WO 98/23877 | 6/1998 |
| WO | WO 01/36836 | 5/2001 |

OTHER PUBLICATIONS

Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.

Z. Wu, C. Richter, L. Menon, A Study of Anodization Process During Pore Formation in Nanoporous Alumina Templates, Journal of the Electrochemical Society, vol. 154, 2007.

W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-B505.

I.V. Sieber, P. Schmuki, Porous Tantalum Oxide Prepared by Electrochemical Anodic Oxidation, Journal of the Electrochemical Society, vol. 152, 2005, pp. C639-C644.

H. Tanaka, A. Shimada, A. Kinoshita, In situ Measurement of the Diameter of Nanopores in Silicon During Anodization in Hydrofluoric Acid Solution, Journal of the Electrochemical socielty, 151(6) C-439-445, (2004).

L.G. Hector, Jr., S. Sheu, Focused Energy Beam Work Roll Surface Texturing Science and Technology, Journal of Materials Processing & Manufacturing Science, vol. 2, Jul. 1993.

P.N. Anyalebechi, Ungrooved Mold Surface Topography Effects on Cast Subsurface Microstructure, Materials Processing Fundamentals, TMS 2007, pp. 49-62.

F. Yigit, Critical Wavelengths for Gap Nucleation in Solidification—Part 1: Theoretical Methodology, Journal of Applied Mechanics, vol. 67, Mar. 2000, pp. 66-76.

P.N. Anyalebechi, Undulatory Solid Shell Growth of Aluminum Alloy 3003 as a Function of the Wavelength of a Grooved Mold Surface Topography, TMS 2007, pp. 31-47.

Dessouki et al., U.S. Appl. No. 10/961,813, Coulumb friction damped disc brake rotors, filed Oct. 8, 2004.

Hanna et al., U.S. Appl. No. 11/475,756, Bi-metal disc brake rotor and method of manufacturing, filed Jun. 27, 2006.

Schroth et al., U.S. Appl. No. 11/475,759, Method of casting components with inserts for noise reduction, filed Jun. 27, 2006.

Schroth et al., U.S. Appl. No. 12/025,967, Damped products and methods of making and using the same, filed Feb. 5, 2008.

Hanna et al., U.S. Appl. No. 11/440,916, Bi-metal disc brake rotor and method of manufacture, filed May 25, 2006.

Hanna et al., U.S. Appl. No. 11/554,234, Coulomb damped disc brake rotor and method of manufacturing, filed Oct. 30, 2006.

Walker et al., U.S. Appl. No. 11/926,798, Inserts with holes for damped products and methods of making and using the same, filed Oct. 29, 2007.

Hanna et al., U.S. Appl. No. 11/832,401, Damped product with insert and method of making the same, filed Aug. 1, 2007.

Kleber, et al., U.S. Appl. No. 11/848,732, Cast-in-place torsion joint, filed Aug. 31, 2007.

Hanna et al., U.S. Appl. No. 11/780,679, Method of manufacturing a damped part, filed Jul. 20, 2007.

Aase et al., U.S. Appl. No. 11/969,259, Method of forming casting with frictional damping insert, filed Jan. 4, 2008.

Hanna et al., U.S. Appl. No. 12/165,729, Method for securing an insert in the manufacture of a damped part, filed Jul. 1, 2008.

Hanna et al., U.S. Appl. No. 12/165,731, Product with metallic foam and method of manufacturing the same, filed Jul. 1, 2008.

Hanna et al., U.S. Appl. No. 12/174,163, Damped part, filed Jul. 16, 2008.

Hanna et al., U.S. Appl. No. 12/174,223, Method of casting damped part with insert, filed Jul. 16, 2008.

Hanna et al., U.S. Appl. No. 12/183,180, Casting noise-damped, vented brake rotors with embedded inserts, filed Jul. 31, 2008.

Hanna et al., U.S. Appl. No. 12/183,104, Low mass multi-piece sound damped article, filed Jul. 31, 2008.

Golden et al., U.S. Appl. No. 12/105,411, Insert with filler to dampen vibrating components, filed Apr. 18, 2008.

Hanna et al., U.S. Appl. No. 11/440,893, Rotor assembly and method, filed May 25, 2006.

Carter, U.S. Appl. No. 11/680,179, Damped automotive components with cast in place inserts and method of making same, filed Feb. 28, 2007.

Ulicny et al., U.S. Appl. No. 12/105,438, Filler material to dampen vibrating components, filed Apr. 18, 2008.

Hanna et al., U.S. Appl. No. 12/272,164, Surface configurations for damping inserts, filed Nov. 17, 2008.

Hanna et al., U.S. Appl. No. 12/145,169, Damped product with an insert having a layer including graphite thereon and methods of making and using the same, filed Jun. 24, 2008.

Lowe et al., U.S. Appl. No. 12/174,320, Damped part with insert, filed Jul. 16, 2008.

Xia, U.S. Appl. No. 12/858,596, Lightweight brake rotor and components with composite materials, filed Sep. 20, 2007.

Dessouki et al., U.S. Appl. No. 12/178,872, Friction damped brake drum, filed Jul. 24, 2008.

Sachdev et al., U.S. Appl. No. 11/832,356, Friction welding method and products made using the same, filed Aug, 1, 2007.

\* cited by examiner

INSERT WITH TABS AND DAMPED PRODUCTS AND METHODS OF MAKING THE SAME

TECHNICAL FIELD

The field to which the disclosure generally relates includes an insert and a damped product containing the insert and methods of making the same.

BACKGROUND

Parts subjected to vibration may produce unwanted or undesirable vibrations. Similarly, a part or component may be set into motion at an undesirable frequency and/or amplitude and for a prolonged period. For example, parts such as brake rotors, brackets, pulleys, brake drums, transmission housings, gears, and other parts may contribute to noise that gets transmitted to the passenger compartment of a vehicle. In an effort to reduce the generation of this noise and thereby its transmission into the passenger compartment, a variety of techniques have been employed, including the use of polymer coatings on engine parts, sound absorbing barriers, and laminated panels having viscoelastic layers. The undesirable vibrations in parts or components may occur in a variety of other products including, but not limited to, sporting equipment, household appliances, manufacturing equipment such as lathes, milling/grinding/drilling machines, earth moving equipment, other non-automotive applications, and components that are subject to dynamic loads and vibration. These components can be manufactured through a variety of means including casting, machining, forging, die-casting, etc.

SUMMARY OF EXEMPLARY EMBODIMENTS OF THE INVENTION

One embodiment includes an insert including a body portion, a plurality of tabs extending from the body portion, wherein the tabs are tapered; and wherein the insert is constructed and arranged to provide damping.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
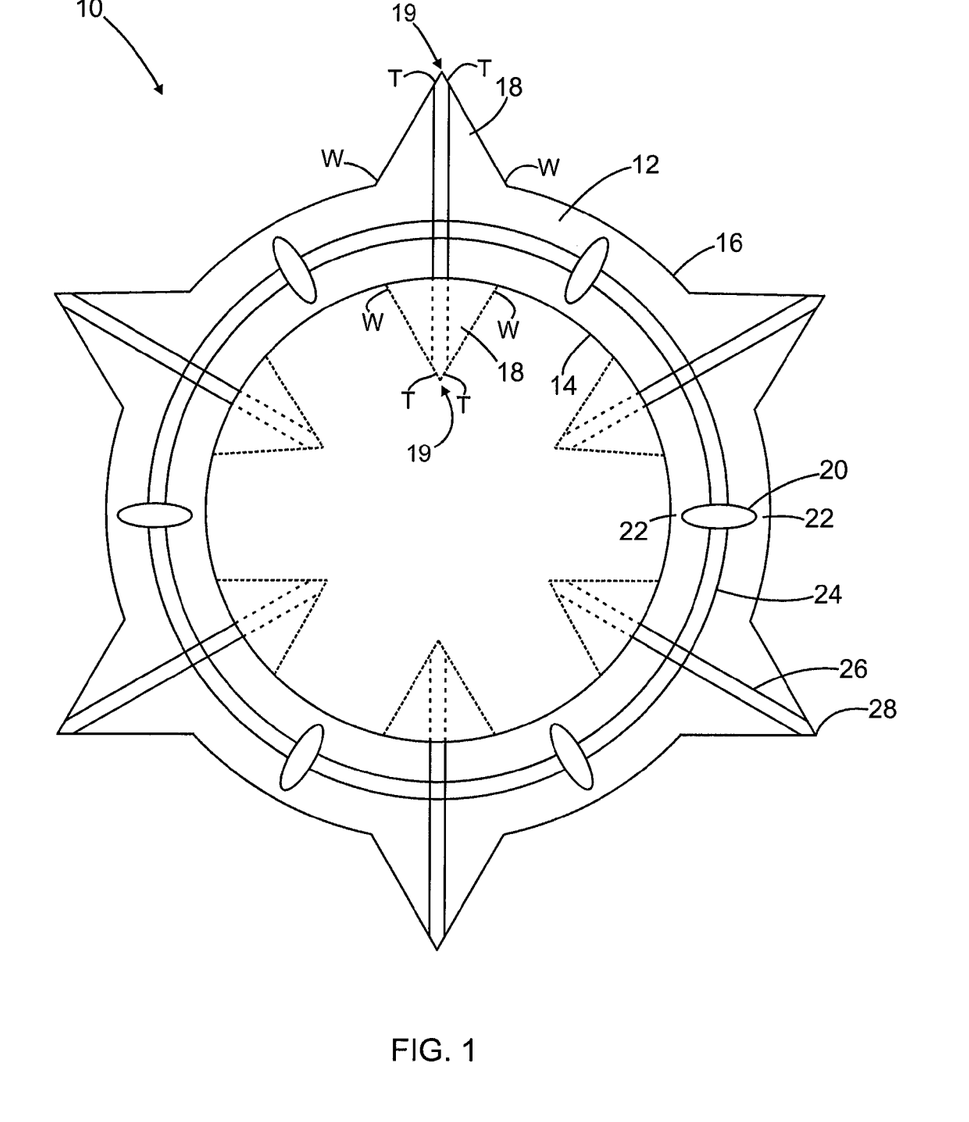
FIG. 1 illustrates a product according to one embodiment of the invention.

Referring to FIG. 1, an insert 10 is provided according to one embodiment of the invention. The insert 10 may provide damping in a part or product 500 as described hereafter. In one embodiment, the insert 10 may comprise steel. In one embodiment, a metal may be cast around the insert 10 to form the part or product 500. In various embodiments, the insert 10 may have various geometric configurations. In one embodiment, the insert 10 may have an annular body 12 comprising an inner edge 14 (at an inner diameter of the annular body 12) and an outer edge 16 (at an outer diameter of the annular body 12). The insert may include a plurality of tabs 18, which may extend from at least one of the inner edge 14 or the outer edge 16 of the annular body 12. In one embodiment, the insert 10 may include twelve tabs 18. In another embodiment, the insert 10 may include any suitable number of tabs 18. In FIG. 1, the tabs 18 extending from the inner edge 14 are shown in phantom.

Figure 2:
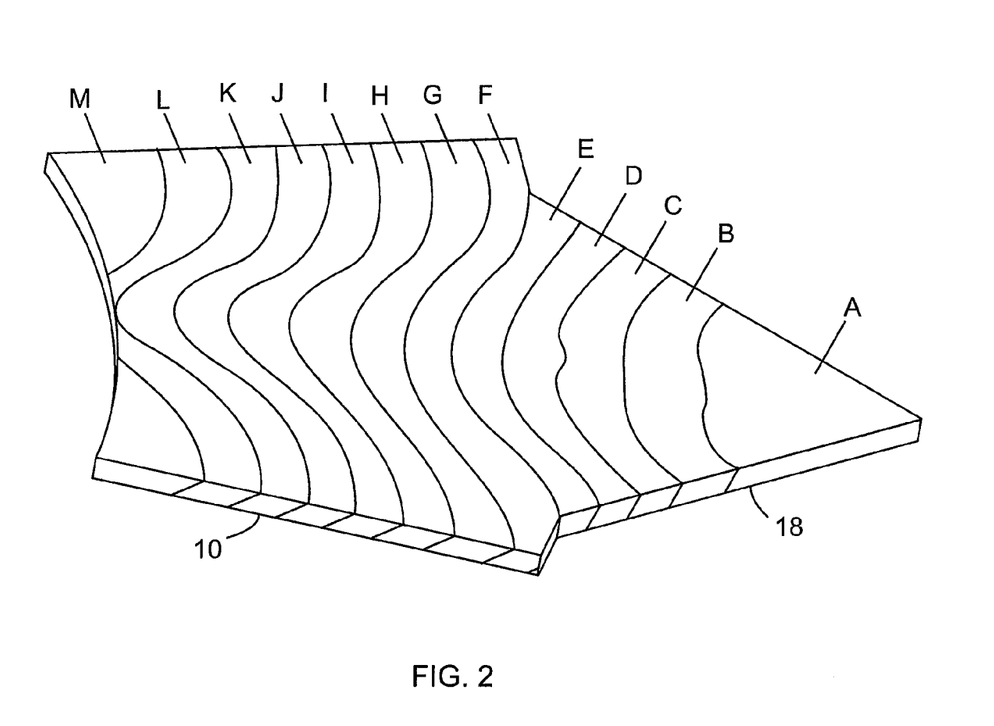
FIG. 2 illustrates a product according to one embodiment of the invention.

The tabs 18 may be tapered, for example from points W-W adjacent the inner edge 14 or outer edge 16 to points T-T near a distal end 19 of the tab 18 of any suitable shape. In one embodiment the tabs 18 may be triangular in shape. In another embodiment, the tabs 18 may be other tapered shapes. In another embodiment the tabs 18 may be square or rectangular. FIG. 2 illustrates a portion of the insert 10 and a tab 18. In the embodiments where the tab 18 is a triangular or tapered shape, the insert 10 may be more stable during casting of a metal around the insert 10 to form the part or product 500 (shown for example in FIGS. 5, 6D). In the manufacturing of the part 500, the tabs 18 may be clamped in a mold, for example a sand mold, to at least partially assist in holding the insert 10 in place. When the metal is cast around the insert 10, portions of the tabs 18 and the insert 10 may experience some displacement. In one embodiment, the insert 10 may be at ambient temperature before the metal is cast, and when the hot metal is cast, the insert may expand due to the positive coefficient of thermal expansion of the insert 10, which may be, for example, steel.

Figure 3:
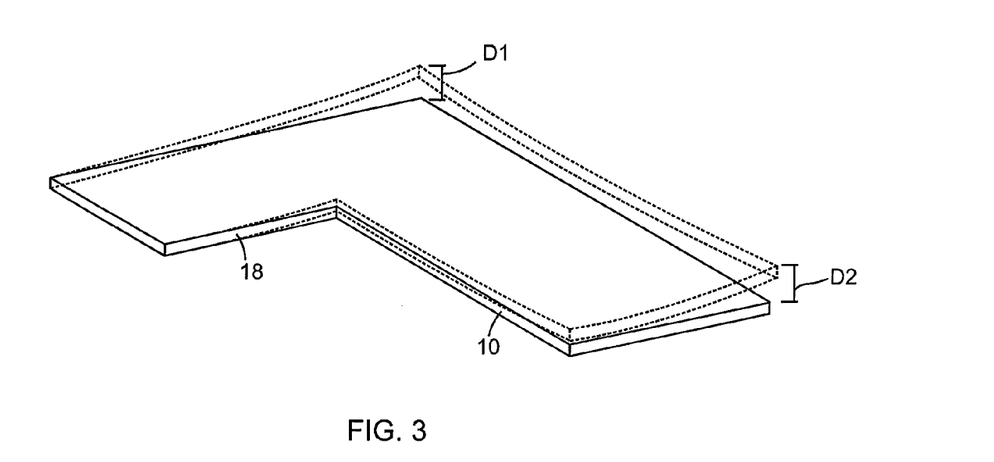
FIG. 3 illustrates a product according to one embodiment of the invention.
Figure 4:
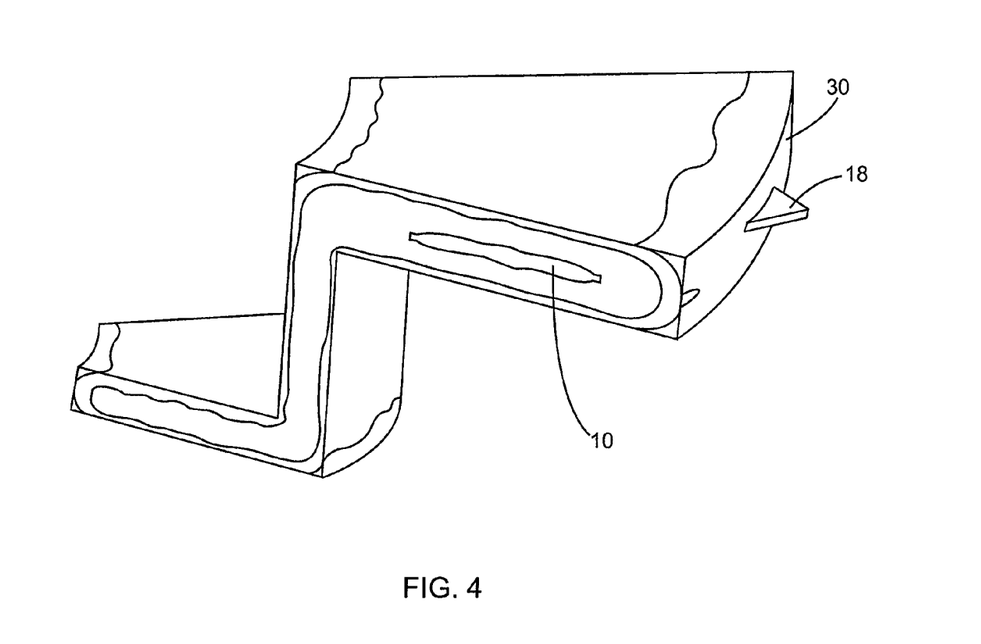
FIG. 4 illustrates a product according to one embodiment of the invention.

As shown in FIG. 3, the regions away from the tabs 18 may have the greatest displacement, as shown by the phantom lines. The insert 10 may be displaced a distance D1 in the direction normal to the insert closer to the tab 18. The distance D1 may be up to about 2 mm. The insert 10 may be displaced a distance D2 in the direction normal to the insert farther from the tab 18. The distance D2 may be up to about 7 mm. Referring to FIG. 2, the smallest amount of out-of-plane distortion of the insert 10 and/or tab 18 is indicated by region A, the largest amount of distortion is indicated by region M, and the amount of distortion increases from region A to region M. In one embodiment, the tabs 18 with a triangular or tapered shape may reduce the out-of-plane distortion of the insert 10 by more than ninety percent.

In one embodiment, the tabs 18 that have a triangular or tapered shape may result in a minimum exposed area of the tabs 18 to the environment during service without compromising on the support that is needed from the tabs 18 during the casting process. As shown in FIG. 2, in one embodiment at least a portion of the tab 18 may pierce the mold 30 during casting in order to accommodate thermal expansion. In one embodiment the tabs 18 that have a triangular or tapered shape may reduce the total area that is exposed to environmental corrosion after the protruding portions of the tabs 18 are machined off following casting.

Referring again to FIG. 1, in one embodiment, the annular body 12 may include a plurality of slots 20. The slots 20 may be of any shape, for example, an oval, circle, square, rectangle, or triangle. The annular body 12 may also include a plurality of connector regions 22, where the connector regions 22 are the portions of the annular body 12 between each slot 20 and the outer edge 16 of the annular body 12, and the portions of the annular body 12 between each slot 20 and the inner edge 14 of the annular body 12.

In one embodiment, during the process of manufacturing a part containing the insert 10, the tabs 18 may allow the insert 10 to be placed securely in the mold. The insert 10 has sufficient rigidity to be loaded into the mold as one piece. But during the process of manufacturing the part or product 500, the plurality of connector regions 22 may be constructed and arranged to melt or dissolve. In this way, the insert 10 becomes segmented or severed during the molding process, and each segment is supported and prevented from moving too much by the tabs 18. Thus, the slots 20 may prevent gross distortion of the insert 10 during the casting process. The insert 10 may be able to expand thermally without moving in the axial direction.

To facilitate the melting or dissolving of the plurality of the connector regions 22, the plurality of connector regions 22 may be thinner than the remainder of the annular body 12. In one embodiment, the connector regions 22 may be of a different material than the remainder of the annular body 12. The connector regions 22 may be composed of a low melting point material. A low melting point material has a melting point lower than the melting point of the remainder of the insert 10. In one embodiment, the low melting point material melts at a temperature less than 2400° F.

One embodiment includes a coating over at least a portion of the insert 10. Another embodiment includes a coating over at least a portion of the annular body 12, but does not include a coating over the tabs 18.

As shown in FIG. 1, according to one embodiment of the invention, the insert 10 includes an annular stiffening rib 24 in the annular body 12. The annular stiffening rib 24 may be approximately equidistant from the inner edge 14 and the outer edge 16. In another embodiment, the insert 10 includes a plurality of radial stiffening ribs 26, which extend from the inner edge 14 of the annular body 12 to the outer edge 28 of the tabs 18. The plurality of radial stiffening ribs 26 on the tabs 18 extending from the inner edge 14 of the annular body 12 are shown in phantom in FIG. 1.

Figure 5:
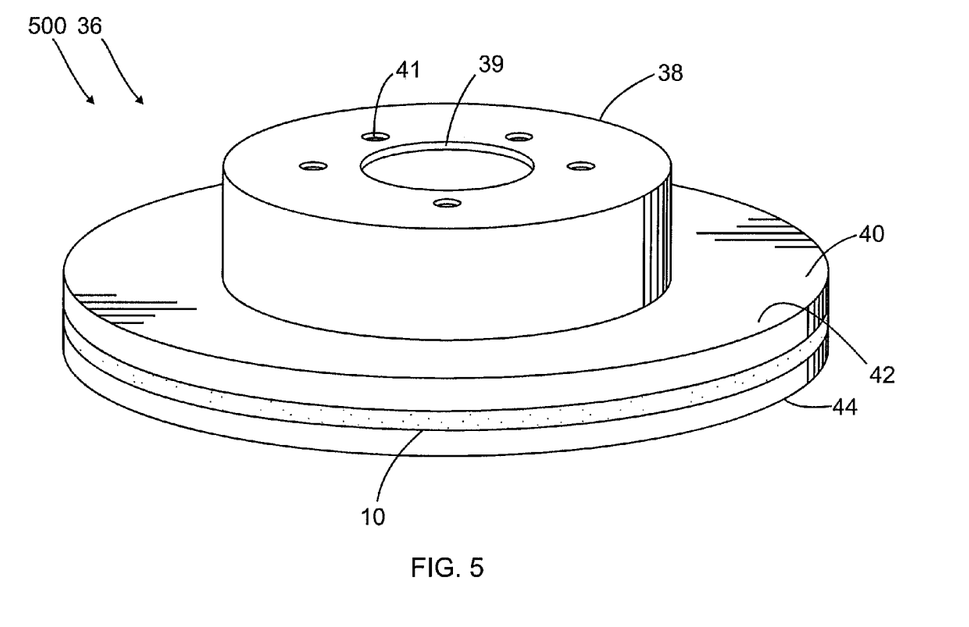
FIG. 5 illustrates a product according to one embodiment of the invention.

The insert 10 may be located in a part 500 as shown in FIG. 5. In various embodiments, the part 500 may include any part subject to vibration including, for example, but not limited to a brake rotor, bracket, pulley, brake drum, transmission housing, gear, motor housing, shaft, bearing, engine, baseball bat, lathe machine, milling machine, drilling machine, or grinding machine. The part 500 may be, for example, a rotor assembly 36. The rotor assembly 36 may include a hub portion 38, an annular portion 40, and the insert 10. The annular portion 40 may include a first frictional surface 42 and a second frictional surface 44. In one embodiment, the hub portion 38 may include a central aperture 39. The hub portion 38 may also include a plurality of bolt holes 41. In another embodiment, the rotor assembly 36 may be vented and the first frictional surface 42 and the second frictional surface 44 may be separated by a plurality of vanes (not shown).

Figure 6A:
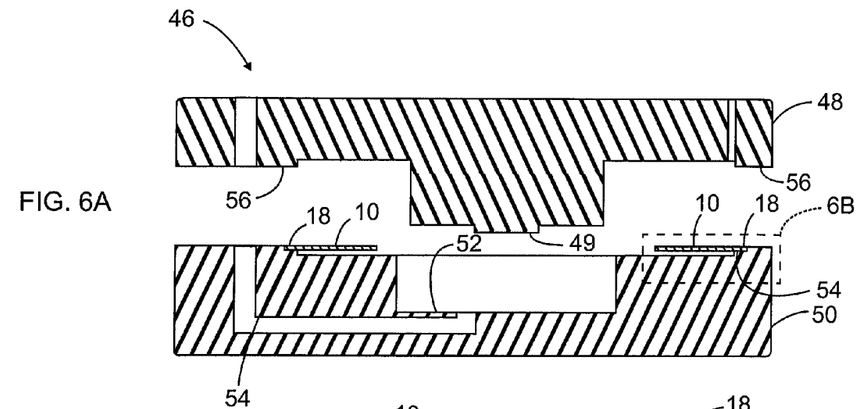
FIG. 6A is a schematic side sectional view of an insert positioned within a mold, according to one embodiment of the invention.

According to one embodiment of the invention, a method is provided for manufacturing the part 500. As shown in FIG. 6A, a mold 46 is provided with a first mold portion 48 and a second mold portion 50. The first mold portion 48 and the second mold portion 50 are configured to manufacture the part 500. Vertical, horizontal or any other molding orientation may be used. The two portions of the mold form a cavity 52 for casting the part 500. The first mold portion 48 and the second mold portion 50 may be sand molds. The first mold portion 48 may also include a generally cylindrical protrusion 49 configured to produce the central aperture 39 (shown in FIG. 5). But in other embodiments, the central aperture 39 may be produced by a subsequent machining process. In one embodiment, the plurality of bolt holes 41 (shown in FIG. 5) may be produced by a plurality of smaller protrusions (not shown) in the first mold portion 48 or by a subsequent machining process.

Figure 6B:
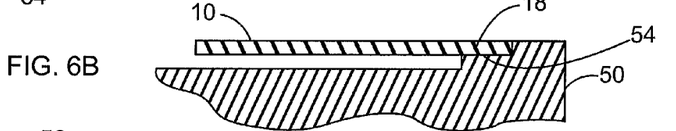
FIG. 6B is an enlarged view of the area 6B identified in FIG. 6A, according to one embodiment of the invention.

Referring to FIG. 6A, the insert 10 is positioned within the second mold portion 50. The tabs 18 of the insert 10 may rest on cutout portions 54 of the second mold portion 50. There may be a coating over at least a portion of the insert 10. In another embodiment, there may be a coating over at least a portion of the annular body 12 but not over the tabs 18. The coating may prevent wetting of the insert 10 during casting. FIG. 6B is an enlarged view of the portion 6B outlined in FIG. 6A, showing the insert 10 positioned within the second mold portion 50.

Figure 6C:
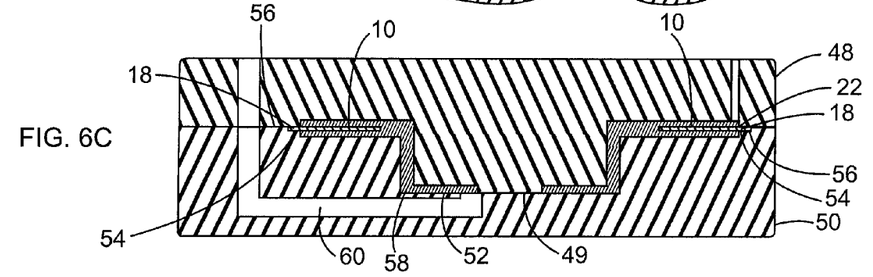
FIG. 6C is a schematic side sectional view of the mold and insert of FIG. 6A with the mold closed and material introduced into the mold, according to one embodiment of the invention.

As shown in FIG. 6C, the mold portions 48 and 50 are then closed together. A compressive force may be applied to the mold portions 48 and 50. The tabs 18 of the insert 10 may be supported between the cutout portions 54 of the second mold portion 50 and the lands 56 of the first mold portion 48. According to one embodiment, a material 58 is then introduced, for example injected, into the cavity 52 through a channel 60 to form the part 500. The material 58 may be a molten substance, for example molten cast iron, gray cast iron, steel, aluminum, aluminum metal matrix composites, or magnesium. In another embodiment, the material 58 is a semi-solid material and may be introduced into the cavity 52 in accordance with the well known semi-solid forging process.

Figure 6D:
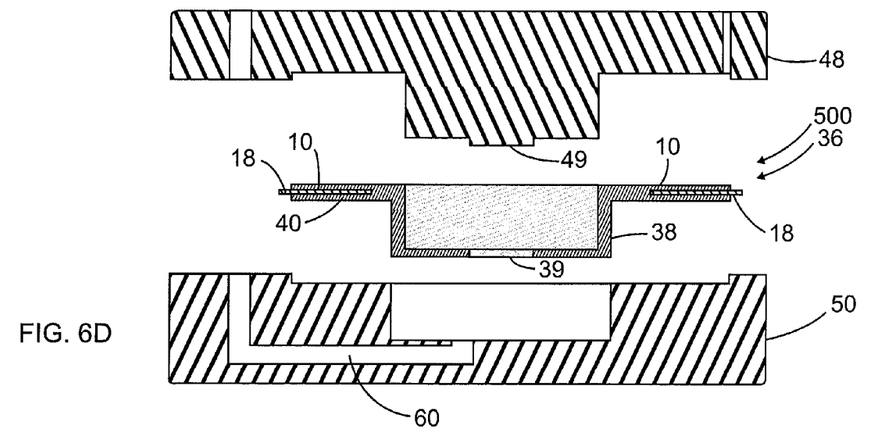
FIG. 6D is a schematic side sectional view of the mold of FIG. 6A, with the mold opened and a part ejected from the mold, according to one embodiment of the invention.

Referring to FIG. 6D, after the material 58 has cooled, the mold 46 may be opened and the finished part 500 may be removed from the mold 46. In one embodiment, the part 500 is a rotor assembly 36 and includes the hub portion 38, the annular portion 40, and the insert 10. In one embodiment, the portion of the tabs 18 that are protruding from the part 500 may be machined off. When the mold portions 48 and 50 are returned to the open position, the next insert 10 may be positioned into the open mold and the manufacturing process of the part 500 may repeat.

Referring to FIGS. 7-21, one embodiment of the invention includes a product or part 500 having a frictional damping means. The frictional damping means may be used in a variety of applications including, but not limited to, applications where it is desirable to reduce noise associated with a vibrating part or reduce the vibration amplitude and/or duration of a part that is struck, dynamically loaded, excited, or set in motion. In one embodiment the frictional damping means may include an interface boundary conducive to frictionally damping a vibrating part. In one embodiment the damping means may include frictional surfaces 502 constructed and arranged to move relative to each other and in frictional contact, so that vibration of the part is dissipated by frictional damping due to the frictional movement of the surfaces 502 against each other.

According to various illustrative embodiments of the invention, frictional damping may be achieved by the movement of the frictional surfaces 502 against each other. The movement of frictional surfaces 502 against each other may include the movement of: surfaces of the body 506 of the part against each other; a surface of the body 506 of the part against a surface of the insert 10; a surface of the body 506 of the part against the layer 520; a surface of the insert 10 against the layer 520; a surface of the body 506 of the part against the particles 514 or fibers; a surface of the insert 10 against the particles 514 or fibers; or by frictional movement of the particles 514 or fibers against each other or against remaining binder material.

In embodiments wherein the frictional surface 502 is provided as a surface of the body 506 or the insert 10 or a layer 520 over one of the same, the frictional surface 502 may have a minimal area over which frictional contact may occur that may extend in a first direction a minimum distance of 0.1 mm and/or may extend in a second (generally traverse) direction a minimum distance of 0.1 mm. In one embodiment the insert 10 may be an annular body and the area of frictional contact on a frictional surface 502 may extend in an annular direction a distance ranging from about 20 mm to about 1000 mm and in a transverse direction ranging from about 10 mm to about 75 mm. The frictional surface 502 may be provided in a variety of embodiments, for example, as illustrated in FIGS. 7-21.

Referring again to FIG. 7, in another embodiment of the invention one or more of the outer surfaces 522, 524 of the insert 10 or surfaces 526, 528 of the body 506 of the part 500 may include a relatively rough surface including a plurality of peaks 510 and valleys 512 to enhance the frictional damping of the part. In one embodiment, the surface of the insert 10 or the body 506 may be abraded by sandblasting, glass bead blasting, water jet blasting, chemical etching, machining or the like.

Figure 7:
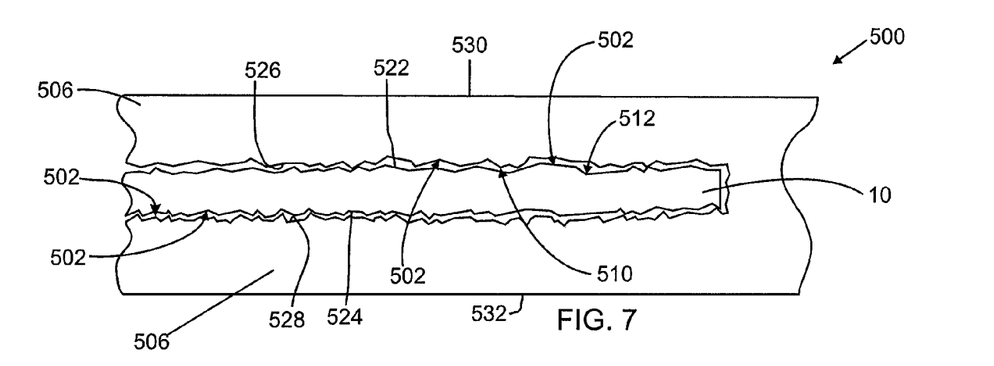
FIG. 7 is a sectional view with portions broken away of one embodiment of the invention including an insert.

Each frictional surface 502 may have a plurality of peaks 510 and a plurality of valleys 512. The depth as indicated by line V of the valleys 512 may vary with embodiments. In various embodiments, the average of the depth V of the valleys 512 may range from about 1 μm-300 μm, 50 μm-260 μm, 100 μm-160 μm or variations of these ranges. However, for all cases there is local contact between the opposing frictional surfaces 502 during component operation for frictional damping to occur.

Figures 10, 11, 12, 13:
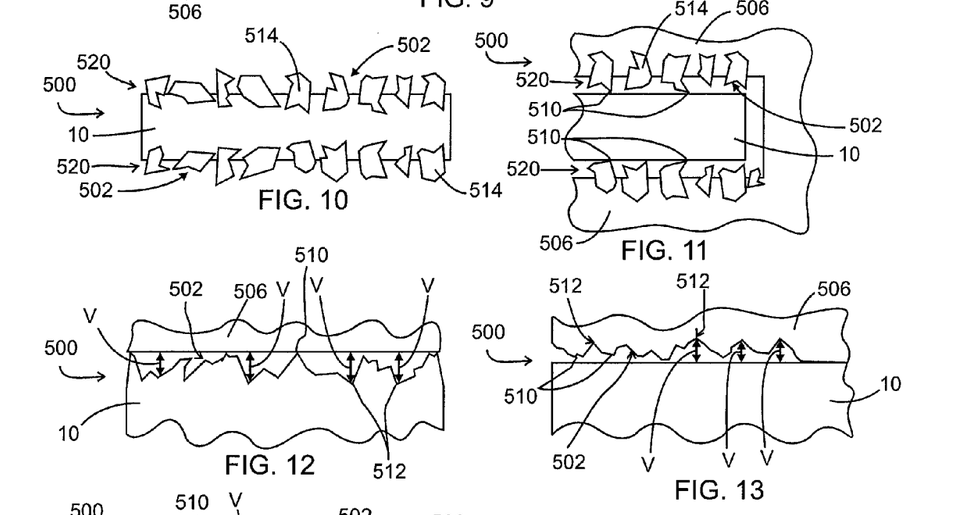
FIG. 10 is an enlarged view of one embodiment of the invention.
FIG. 11 is a sectional view with portions broken away of one embodiment of the invention.
FIG. 12 is an enlarged sectional view with portions broken away of one embodiment of the invention.
FIG. 13 is an enlarged sectional view with portions broken away of one embodiment of the invention.
Figure 14:
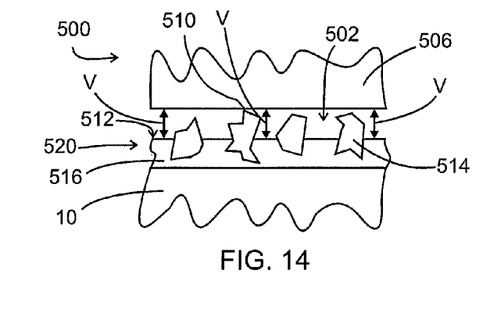
FIG. 14 is an enlarged sectional view with portions broken away of one embodiment of the invention.
Figure 15:
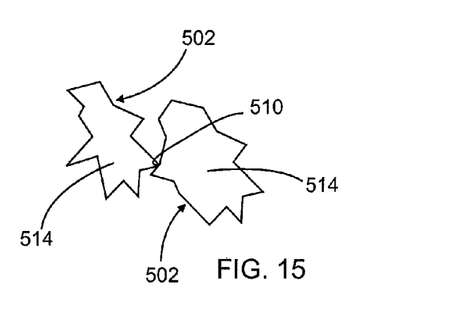
FIG. 15 illustrates one embodiment of the invention.

In another embodiment of the invention the damping means or frictional surface 502 may be provided by particles 514 or fibers provided on at least one face of the insert 10 or a surface of the body 506 of the part 500. The particles 514 may have an irregular shape (e.g., not smooth) to enhance frictional damping, as illustrated in FIG. 15. One embodiment of the invention may include a layer 520 including the particles 514 or fibers which may be bonded to each other or to a surface of the body 506 of the part or a surface of the insert 10 due to the inherent bonding properties of the particles 514 or fibers. For example, the bonding properties of the particles 514 or fibers may be such that the particles 514 or fibers may bind to each other or to the surfaces of the body 506 or the insert 10 under compression. In another embodiment of the invention, the particles 514 or the fibers may be treated to provide a coating thereon or to provide functional groups attached thereto to bind the particles together or attach the particles to at least one of a surface of the body 506 or a surface of the insert 10. In another embodiment of the invention, the particles 514 or fibers may be embedded in at least one of the body 506 of the part or the insert 10 to provide the frictional surface 502 (FIGS. 10-11).

In embodiments wherein at least a portion of the part 500 is manufactured such that the insert 10 and/or the particles 514 or fibers are exposed to the temperature of a molten material such as in casting, the insert 10 and/or particles 514 or fibers may be made from materials capable of resisting flow or resisting significant erosion during the manufacturing. For example, the insert 10 and/or the particles 514 or fibers may include refractory materials capable of resisting flow or that do not significantly erode at temperatures above 1100° F., above 2400° F., or above 2700° F. When molten material, such as metal, is cast around the insert 10 and/or the particles 514, the insert 10 or the particles 514 should not be wet by the molten material so that the molten material does not bond to the insert 10 or layer 520 at locations wherein a frictional surface 502 for providing frictional damping is desired.

Illustrative examples of suitable particles 514 or fibers include, but are not limited to, particles or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one embodiment of the invention the particles 514 may have a length along the longest dimension thereof ranging from about 1 μm-350 μm, or 10 μm-250 μm.

Figure 9:
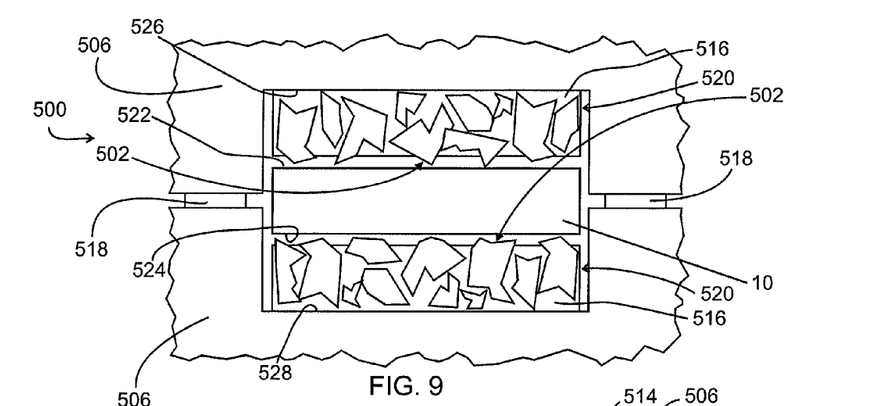
FIG. 9 is a sectional view with portions broken away of one embodiment of the invention.

In embodiments wherein the part 500 is made using a process wherein the insert 10 and/or the particles 514 or fibers are not subjected to relatively high temperatures associated with molten materials, the insert 10 and/or particles 514 or fibers may be made from a variety of other materials including, but not limited to, non-refractory polymeric materials, ceramics, composites, wood or other materials suitable for frictional damping. For example, such non-refractory materials may also be used (in additional to or as a substitute for refractory materials) when two portions of the body 506 of the part 500 are held together mechanically by a locking mechanism, or by fasteners, or by adhesives, or by welding 518, as illustrated in FIG. 9.

In another embodiment of the invention, the layer 520 may be a coating over the body 506 of the part or the insert 10. The coating may include a plurality of particles 514 which may be bonded to each other and/or to the surface of the body 506 of the part or the insert 10 by an inorganic or organic binder 516 (FIGS. 8-9, 14) or other bonding materials. Illustrative examples of suitable binders include, but are not limited to, epoxy resins, phosphoric acid binding agents, calcium aluminates, sodium silicates, wood flour, or clays. In another embodiment of the invention the particles 514 may be held together and/or adhered to the body 506 or the insert 10 by an inorganic binder. In one embodiment, the coating may be deposited on the insert 10 or body 506 as a liquid dispersed mixture of alumina-silicate-based, organically bonded refractory mix.

In another embodiment, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include IronKote. In one embodiment, a liquid coating may be deposited on a portion of the insert and may include any high temperature ceramic coating, such as but not limited to, Ladle Kote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

When the layer 520 including particles 514 or fibers is provided over the insert 10 or the body 506 of the part the thickness L (FIG. 8) of the layer 520, particles 514 and/or fibers may vary. In various embodiments, the thickness L of the layer 520, particles 514 and/or fibers may range from about 1 μm-400 μm, 10 μm-400 μm, 30 μm-300 μm, 30 μm-40 μm, 40 μm-100 μm, 100 μm-120 μm, 120 μm-200 μm, 200 μm-300 μm, 200 μm-250 μm, or variations of these ranges.

In yet another embodiment of the invention the particles 514 or fibers may be temporarily held together and/or to the surface of the insert 10 by a fully or partially sacrificial coating. The sacrificial coating may be consumed by molten metal or burnt off when metal is cast around or over the insert 10. The particles 514 or fibers are left behind trapped between the body 506 of the cast part and the insert 10 to provide a layer 520 consisting of the particles 514 or fibers or consisting essentially of the particles 514 or fibers.

Figure 8:
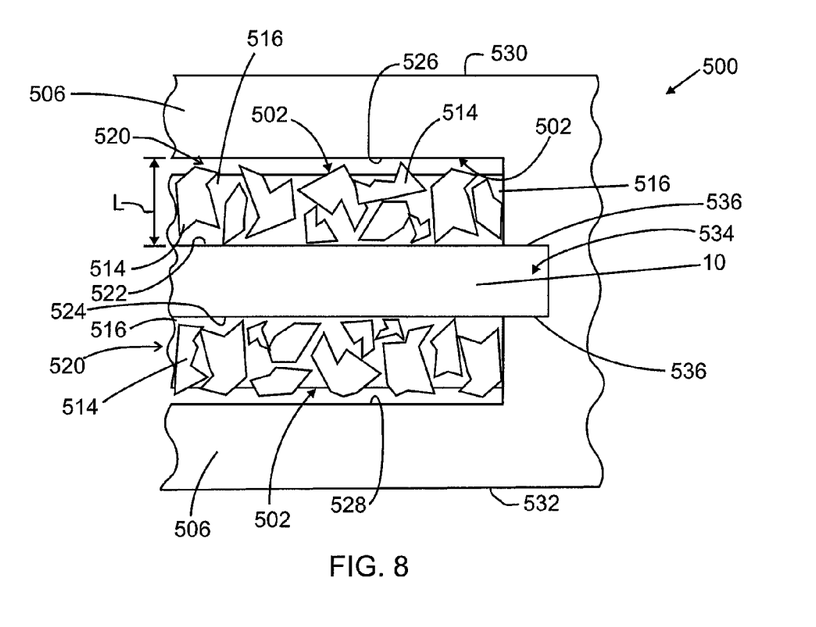
FIG. 8 is a sectional view with portions broken away of one embodiment of the invention including an insert having a layer thereon to provide a frictional surface for damping.

The layer 520 may be provided over the entire insert 10 or only over a portion thereof. In one embodiment of the invention the insert 10 may include a tab 534 (FIG. 8). For example, the insert 10 may include an annular body portion and a tab 534 extending radially inward or outward therefrom. In one embodiment of the invention at least one wettable surface 536 of the tab 534 does not include a layer 520 including particles 514 or fibers, or a wettable material such as graphite is provided over the tab 534, so that the cast metal is bonded to the wettable surface 536 to attach the insert 10 to the body 506 of the part 500 but still allow for frictional damping over the remaining insert surface which is not bonded to the casting.

In one embodiment of the invention at least a portion of the insert 10 is treated or the properties of the insert 10 are such that molten metal will not wet or bond to that portion of the insert 10 upon solidification of the molten metal. According to one embodiment of the invention at least one of the body 506 of the part or the insert 10 includes a metal, for example, but not limited to, aluminum, titanium, steel, stainless steel, cast iron, any of a variety of other alloys, or metal matrix composite including abrasive particles. In one embodiment of the invention the insert 10 may include a material such as a metal having a higher melting point than the melting point of the molten material being cast around a portion thereof.

In one embodiment, the insert 10 may have a minimum average thickness of 0.2 mm and/or a minimum width of 0.1 mm and/or a minimum length of 0.1 mm. In another embodiment the insert 10 may have a minimum average thickness of 0.2 mm and/or a minimum width of 2 mm and/or a minimum length of 5 mm. In other embodiments the insert 10 may have a thickness ranging from about 0.1-20 mm, 0.1-6.0 mm, or 1.0-2.5 mm, or ranges therebetween.

Referring now to FIGS. 12-13, again the frictional surface 502 may have a plurality of peaks 510 and a plurality of valleys 512. The depth as indicated by line V of the valleys 512 may vary with embodiments. In various embodiments, the average of the depth V of the valleys 512 may range from about 1 μm-300 μm, 50 μm-260 μm, 100 μm-160 μm or variations of these ranges. However, for all cases there is local contact between the body 506 and the insert 10 during component operation for frictional damping to occur.

In other embodiments of the invention improvements in the frictional damping may be achieved by adjusting the thickness (L, as shown in FIG. 8) of the layer 520, or by adjusting the relative position of opposed frictional surfaces 502 or the average depth of the valleys 512.

In one embodiment the insert 10 is not pre-loaded or under pre-tension or held in place by tension. In one embodiment the insert 10 is not a spring. Another embodiment of the invention includes a process of casting a material comprising a metal around an insert 10 with the proviso that the frictional surface 502 portion of the insert used to provide frictional damping is not captured and enclosed by a sand core that is placed in the casting mold. In various embodiments the insert 10 or the layer 520 includes at least one frictional surface 502 or two opposite friction surfaces 502 that are completely enclosed by the body 506 of the part. In another embodiment the layer 520 including the particles 514 or fibers that may be completely enclosed by the body 506 of the part or completely enclosed by the body 506 and the insert 10, and wherein at least one of the body 506 or the insert 10 comprises a metal or consists essentially of a metal. In one embodiment of the invention the layer 520 and/or insert 10 does not include or is not carbon paper or cloth.

Referring again to FIGS. 7-9, in various embodiments of the invention the insert 10 may include a first face 522 and an opposite second face 524 and the body 506 of the part may include a first inner face 526 adjacent the first face 522 of the insert 10 constructed to be complementary thereto, for example nominally parallel thereto. The body 506 of the part includes a second inner face 528 adjacent to the second face 524 of the insert 10 constructed to be complementary thereto, for example parallel thereto. The body 506 may include a first outer face 530 overlying the first face 522 of the insert 10 constructed to be complementary thereto, for example parallel thereto. The body 506 may include a first outer face 532 overlying the second face 524 of the insert 10 constructed to be complementary thereto, for example parallel thereto. However, in other embodiments of the invention the outer faces 530, 532 of the body 506 are not complementary to associated faces 522, 524 of the insert 10. In other embodiments the surfaces 526 and 528; 526 and 522; or 528 and 524 are mating surfaces but not parallel to each other.

Figure 16:
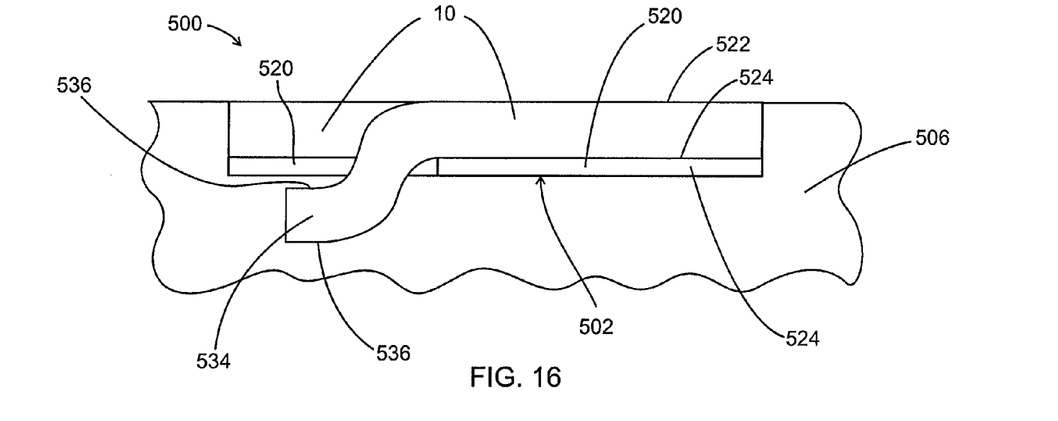
FIG. 16 is a sectional view with portions broken away of one embodiment of the invention.
Figure 17:
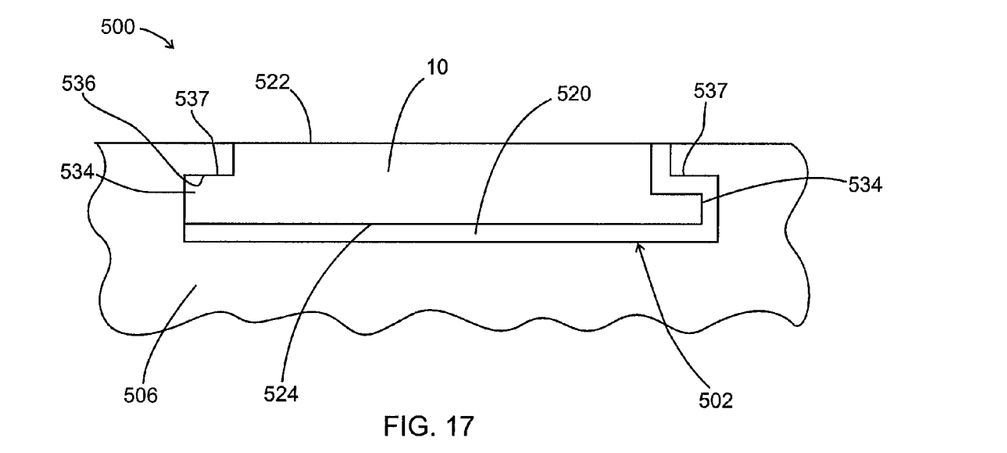
FIG. 17 is a sectional view with portions broken away of one embodiment of the invention.

Referring to FIGS. 16-17, in one embodiment of the invention the insert 10 may be an inlay wherein a first face 522 thereof is not enclosed by the body 506 of the part. The insert 10 may include a tang or tab 534 which may be bent downward as shown in FIG. 16. In one embodiment of the invention a wettable surface 536 may be provided that does not include a layer 520 including particles 514 or fibers, or a wettable material such as graphite is provided over the tab 534, so that the cast metal is bonded to the wettable surface 536 to attach the insert 10 to the body of the part but still allow for frictional damping on the non-bonded surfaces. A layer 520 including particles 514 or fibers may underlie the portion of the second face 524 of the insert 10 not used to make the bent tab 534.

In another embodiment, the insert 10 includes a tab 534 which may be formed by machining a portion of the first face 522 of the insert 10 (FIG. 17). The tab 534 may include a wettable surface 536 having cast metal bonded thereto to attach the insert 10 to the body of the part but still allow for friction damping by way of the non-bonded surfaces. A layer 520 including particles 514 or fibers may underlie the entire second face 524 or a portion thereof. In other embodiments of the invention, all surfaces including the tabs 534 may be non-wettable, for example by way of a coating 520 thereon, and features of the body portion 506 such as, but not limited to, a shoulder 537 may be used to hold the insert 10 in place (as shown in FIG. 17).

Figure 18:
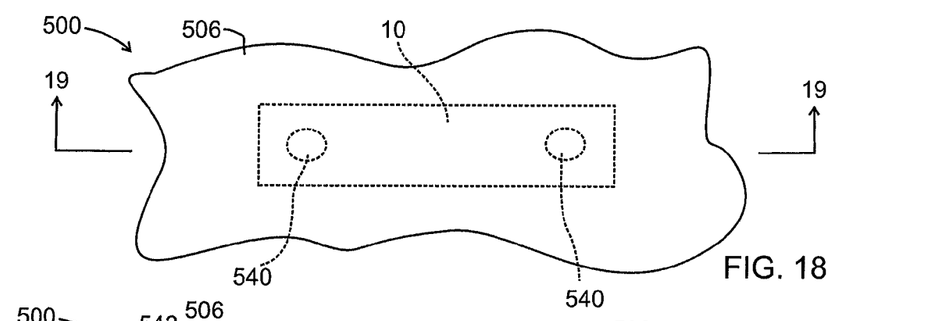
FIG. 18 is a plan view with portions broken away illustrating one embodiment of the invention.

Referring now to FIG. 18, one embodiment of the invention may include a part 500 having a body portion 506 and an insert 10 enclosed by the body part 506. The insert 10 may include through holes formed therein so that a stake or post 540 extends into or through the insert 10.

Figure 19:
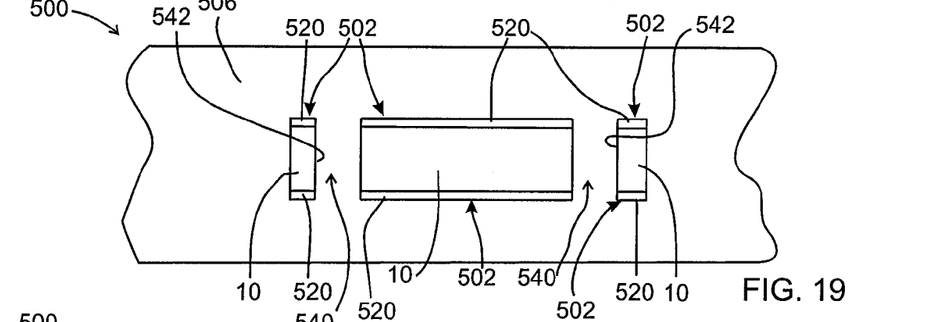
FIG. 19 is a sectional view taken along line 19-19 of FIG. 18 illustrating one embodiment of the invention.

Referring to FIG. 19, which is a sectional view of FIG. 18 taken along line 19-19, in one embodiment of the invention a layer 520 including a plurality of particles 514 or fibers (not shown) may be provided over at least a portion of the insert 10 to provide a frictional surface 502 and to prevent bonding thereto by cast metal. The insert 10 including the layer 520 may be placed in a casting mold and molten metal may be poured into the casting mold and solidified to form the post 540 extending through the insert 10. An inner surface 542 defining the through hole of the insert 10 may be free of the layer 520 or may include a wettable material thereon so that the post 540 is bonded to the insert 10. Alternatively, in another embodiment the post 540 may not be bonded the insert 10 at the inner surface 542. The insert 10 may include a feature such as, but not limited to, a shoulder 505 (shown in FIGS. 20-21), and/or the post 540 may include a feature such as, but not limited to, a shoulder 537 to hold the insert in place.

Figure 20:
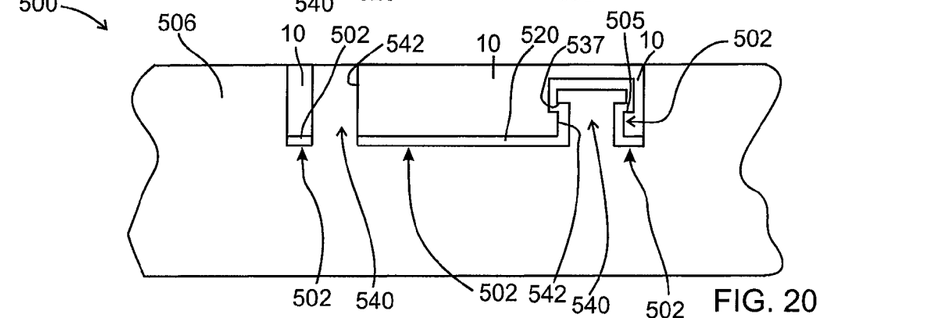
FIG. 20 is a sectional view with portions broken away illustrating one embodiment of the invention.

Referring now to FIG. 20, in another embodiment, the insert may be provided as an inlay in a casting including a body portion 506 and may include a post 540 extending into or through the insert 10. The insert 10 may be bonded to the post 540 to hold the insert in place and still allow for frictional damping. In one embodiment of the invention the insert 10 may include a recess defined by an inner surface 542 of the insert 10 and a post 540 may extend into the insert 10 but not extend through the insert 10. In one embodiment the post 540 may not be bonded to the insert 10 at the inner surface 542. The insert 10 may include a feature such as, but not limited to, a shoulder 505 and/or the post 540 may include a feature such as, but not limited to, a shoulder 537 to hold the insert in place.

Figure 21:
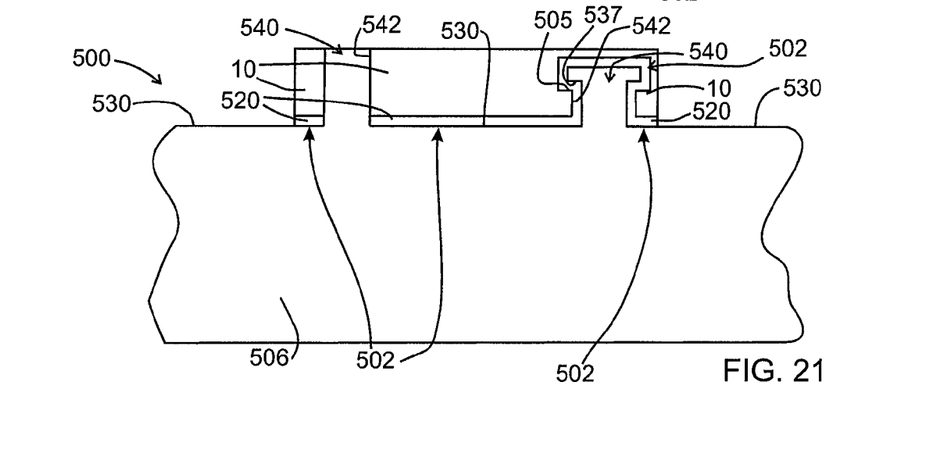
FIG. 21 is a sectional view, with portions broken away illustrating another embodiment of the invention.

Referring now to FIG. 21, in another embodiment of the invention, an insert 10 or substrate may be provided over an outer surface 530 of the body portion 506. A layer 520 may or may not be provided between the insert 10 and the outer surface 530. The insert 10 may be constructed and arranged with through holes formed therethrough or a recess therein so that cast metal may extend into or through the insert 10 to form a post 540 to hold the insert in position and still allow for frictional damping. The post 540 may or may not be bonded to the insert 10 as desired. The post 540 may extend through the insert 10 and join another portion of the body 506 if desired.

When the term "over," "overlying," "overlies," "under," "underlying," or "underlies" is used herein to describe the relative position of a first layer or component with respect to a second layer or component such shall mean the first layer or component is directly on and in direct contact with the second layer or component or that additional layers or components may be interposed between the first layer or component and the second layer or component.

The above description of embodiments of the invention is merely exemplary in nature and, thus, variations thereof are not to be regarded as a departure from the spirit and scope of the invention.

What is claimed is:

1. A method of manufacturing a damped part comprising:
providing an insert comprising a body portion comprising an inner edge and an outer edge; a plurality of tabs extending from at least one of the inner edge or outer edge of the body portion and wherein the tabs are tapered;
positioning the insert in a mold such that the plurality of tabs at least assist in holding the insert in a desired position in the mold; and
casting a material comprising a metal around the insert to form a part.

2. A method of manufacturing a damped part as set forth in claim 1 wherein the tabs have a triangular shape.

3. A method of manufacturing a damped part as set forth in claim 1 further comprising providing a coating over at least a portion of the body portion of the insert.

4. A method of manufacturing a damped part as set forth in claim 3 wherein the coating comprises at least one of silica, alumina, graphite with clay, silicon carbide, silicon nitride, cordierite (magnesium-iron-aluminum silicate), mullite (aluminum silicate), zirconia (zirconium oxide), phyllosilicates, other high-temperature-resistant particles, clay, $Al_2O_3$, $SiO_2$, an organic binder, an inorganic binder, a lignosulfonate binder, a calcium lignosulfonate binder, cristobalite ($SiO_2$), a fiber, a ceramic fiber, a mineral fiber, quartz, an epoxy resin, a phosphoric acid binding agent, calcium aluminates, sodium silicates, wood flour, non-refractory polymeric materials, ceramics, composites, wood, or a liquid dispersed mixture of alumina-silicate-based, organically bonded refractory mix.

5. A method of manufacturing a damped part as set forth in claim 1 wherein the insert comprises steel.

6. A method of manufacturing a damped part as set forth in claim 1 wherein the material comprises cast iron.

7. A method as set forth in claim 1 further comprising providing a layer comprising particles or fibers over at least a portion of the insert.

8. A method as set forth in claim 1 further comprising treating at least a portion of the insert so that the material comprising a metal does not wet the portion of the insert and bond thereto upon solidification.

9. A method as set forth in claim 1 wherein the body portion is annular.

* * * * *